United States Patent
Batni et al.

(10) Patent No.: US 9,210,252 B2
(45) Date of Patent: Dec. 8, 2015

(54) END-USER DEVICE PERSONALIZED APPLICATION NOTIFICATION FEATURE

(75) Inventors: Ramachendra P. Batni, Phoenix, AZ (US); Ranjan Sharma, New Albany, OH (US)

(73) Assignee: Alcatel Lucent, Boulogne-Billancourt (FR)

(*) Notice: Subject to any disclaimer, the term of this patent is extended or adjusted under 35 U.S.C. 154(b) by 2112 days.

(21) Appl. No.: 11/485,890

(22) Filed: Jul. 13, 2006

(65) Prior Publication Data

US 2008/0016188 A1  Jan. 17, 2008

(51) Int. Cl.
*H04W 74/04* (2009.01)
*H04M 1/725* (2006.01)
*H04L 29/08* (2006.01)

(52) U.S. Cl.
CPC ........... *H04M 1/72566* (2013.01); *H04L 67/04* (2013.01); *H04L 67/06* (2013.01); *H04L 67/325* (2013.01)

(58) Field of Classification Search
CPC ....... H04L 67/04; H04L 67/325; H04L 67/67; H04M 1/72566
USPC .......................................................... 709/217
See application file for complete search history.

(56) References Cited

U.S. PATENT DOCUMENTS

| | | | | |
|---|---|---|---|---|
| 5,165,012 A | * | 11/1992 | Crandall et al. | 715/809 |
| 5,742,668 A | * | 4/1998 | Pepe et al. | 455/415 |
| 6,088,026 A | * | 7/2000 | Williams | 715/202 |
| 6,480,830 B1 | * | 11/2002 | Ford et al. | 705/9 |
| 6,694,295 B2 | * | 2/2004 | Lindholm et al. | 704/252 |
| 7,532,877 B2 | * | 5/2009 | Lee et al. | 455/412.2 |
| 7,706,843 B2 | * | 4/2010 | Kaplan | 455/567 |
| 2001/0008399 A1 | * | 7/2001 | Oosterholt et al. | 345/418 |
| 2001/0019603 A1 | * | 9/2001 | McMahon | 379/67.1 |
| 2002/0152276 A1 | * | 10/2002 | Jablow | 709/207 |
| 2003/0008686 A1 | * | 1/2003 | Park et al. | 455/566 |
| 2003/0060979 A1 | * | 3/2003 | Andrews et al. | 701/213 |
| 2003/0126136 A1 | * | 7/2003 | Omoigui | 707/10 |
| 2003/0182170 A1 | * | 9/2003 | Meunitz | 705/9 |
| 2004/0002958 A1 | * | 1/2004 | Seshadri et al. | 707/3 |
| 2004/0039596 A1 | * | 2/2004 | Geertsen et al. | 705/1 |
| 2004/0059903 A1 | * | 3/2004 | Smith et al. | 713/1 |
| 2004/0086094 A1 | * | 5/2004 | Bosik et al. | 379/88.12 |
| 2004/0128093 A1 | * | 7/2004 | Cragun et al. | 702/79 |
| 2004/0181604 A1 | * | 9/2004 | Immonen | 709/232 |
| 2004/0203644 A1 | * | 10/2004 | Anders et al. | 455/414.1 |
| 2004/0264654 A1 | * | 12/2004 | Reding et al. | 379/88.12 |
| 2005/0076109 A1 | * | 4/2005 | Mathew et al. | 709/223 |
| 2005/0105374 A1 | * | 5/2005 | Finke-Anlauff et al. | 365/232 |

(Continued)

OTHER PUBLICATIONS

"FileConnection API," Motorolla Corp., Jun. 1, 2006.*

*Primary Examiner* — Larry Donaghue
(74) *Attorney, Agent, or Firm* — Patti & Malvone Law Group, LLC

(57) ABSTRACT

A method is provided for displaying, upon an attempt to configure a personalized notification of an event, a menu of categories of multi-media content available on a communications device. An indication of the categories of multi-media content desired by a user of the communications device and a scheduled date and time for the event are stored. Upon the occurrence of the scheduled date and time, particular notification files selected by the user and associated with the categories of multi-media content are generated on the communications device as the personalized notification.

28 Claims, 2 Drawing Sheets

(56) References Cited

U.S. PATENT DOCUMENTS

| | | | |
|---|---|---|---|
| 2005/0108233 A1* | 5/2005 | Metsatahti et al. | 707/9 |
| 2005/0108644 A1* | 5/2005 | Finke-Anlauff et al. | 715/721 |
| 2005/0202385 A1* | 9/2005 | Coward et al. | 434/307 R |
| 2006/0015254 A1* | 1/2006 | Smith | 702/3 |
| 2006/0077055 A1* | 4/2006 | Basir | 340/539.13 |
| 2006/0147002 A1* | 7/2006 | Desai et al. | 379/100.06 |
| 2006/0199611 A1* | 9/2006 | Eskelinen | 455/556.2 |
| 2006/0280036 A1* | 12/2006 | Hegarty | 368/73 |
| 2007/0014280 A1* | 1/2007 | Cormier et al. | 370/352 |
| 2007/0190991 A1* | 8/2007 | Cargille | 455/415 |
| 2007/0232223 A1* | 10/2007 | Bilange | 455/3.06 |
| 2008/0101762 A1* | 5/2008 | Kellock et al. | 386/52 |
| 2011/0099511 A1* | 4/2011 | Waldeck | 715/786 |

\* cited by examiner

END-USER DEVICE PERSONALIZED APPLICATION NOTIFICATION FEATURE

TECHNICAL FIELD

This invention relates to the art of hand-held mobile devices and desktop computers, and more particularly to customizing multi-media features on hand-held mobile devices and desktop computers to serve as event reminders.

BACKGROUND

Consumers of personal computers and communication devices, e.g., mobile phones, smart phones, personal digital assistance (PDA) device, two-way pagers, wire-line phones, portable media players, etc., demand customized device features. Consumers have become sophisticated users of such devices, requiring applications and tools beyond basic computing and communications functions. Examples of such applications are alarm clock and calendar features.

Many personal computers and communication devices contain stored audio and video clips, which may have been downloaded as favorites. Also, most personal computers and communication devices allow users to record short announcements or messages, e.g., names, greetings, etc. More advanced personal computers and communication devices allow users to capture still pictures and short audio and video clips.

In general, the application programs on personal computers and communication devices have limited capabilities for notifying consumers of events. Illustratively, when a consumer sets an alarm clock feature, the alarm clock application program notifies the consumer with a brief chime that has been preset by the software manufacturer. Optionally, a short text message may be displayed, e.g., via a pop-up window for a calendar feature in a computer, as a notification along with the brief chime. Also, some programs send email, facsimile, or telephone calls to notify and remind consumers of appointments.

Disadvantageously, reading a text message that is displayed for a brief period of time may be inconvenient for the consumer if the consumer is a) driving, diverting the attention of the consumer away from the road, or b) otherwise preoccupied. Also disadvantageously, an alert from the pop-up window is useless if the consumer is not viewing the computer display. Further disadvantageously, the consumer does not have the flexibility to configure or provision multi-media content, e.g., a tone, audio clip, or video clip, etc., that may be available on the communications device for use by the alarm clock application program for notification purposes.

SUMMARY

It has been recognized, in accordance with the principles of the invention, that the problems of the prior art can be overcome by a technique for personalizing and customizing notification features on end-user devices. More specifically, the technique for personalizing and customizing notification features on end-user devices assists in reminding users of events by a) displaying, upon an attempt by a user of a communications device to configure a personalized notification of a specific event, a menu of categories of multi-media content available on the communications device, b) storing, upon selection by the user, i) the categories of multi-media content desired by the user and ii) a scheduled date and time for the specific event, and c) generating, upon an occurrence of the scheduled date and time, the personalized notification on the communications device, wherein the personalized notification contains particular notification files selected by the user and associated with the categories of multi-media content.

DETAILED DESCRIPTION

The present invention allows a user of a communications device to form associations among a variety of multi-media content files, e.g., a) chimes, b) text messages, c) images, d) audio clips, e) video clips and f) ring tones, that may be available on the communications device. The associated multi-media content may be used by application programs, e.g., alarms, calendars, etc., that reside on the communications device as personalized notifications and reminders of specific events. Illustratively, a user may set an alarm on the communications device for a specific date and time, and associate stored files, e.g., an audio clip, a text message, a video clip, etc., to be used by the alarm program to notify the user when the specific date and time arrives.

The user will not be limited to multi-media content resident on the communications device, because the user may create additional multi-media content as needed. Also, the user may a) store media clips, e.g., audio and video or images and text linked as a reminder message, created for one event and b) re-use the media clips for a future event. Furthermore, if the communications device has text-to-speech capabilities, then the user may be notified without looking at the communications device when the media clip has a text component. Thus, users may personalize their calendar and alarm notification features by associating a variety of multi-media content with dates and times for specific events.

For ease of explanation, the method of the present invention will be explained in the context of a communications device which may be a small, light-weight portable mobile telephone, e.g., pocket telephone, not shown. In one embodiment, the present invention may be implemented as an add-in application on the mobile telephone and operate in conjunction with an existing calendar program and/or an existing alarm clock program resident on the mobile telephone. In an alternative embodiment, the present invention may be implemented as an enhancement to an existing calendar or alarm clock application on the mobile telephone. In yet another embodiment, the present invention may be implemented as a replacement for an existing calendar or alarm clock application on the mobile telephone.

It will be readily understood that the method of the present invention is not limited to a mobile "pocket" telephone. In an alternative embodiment of the invention, the communications device may be a mobile telephone installed in an engine-driven vehicle and supplied with current from the vehicle electrical system. In yet another embodiment of the invention, the communications device may be a personal digital assistance (PDA) device, a two-way pager, a notebook computer, a desk top computer, a portable media player that allows an addition of executable programs, or other suitable handheld communications devices.

Figure 1:
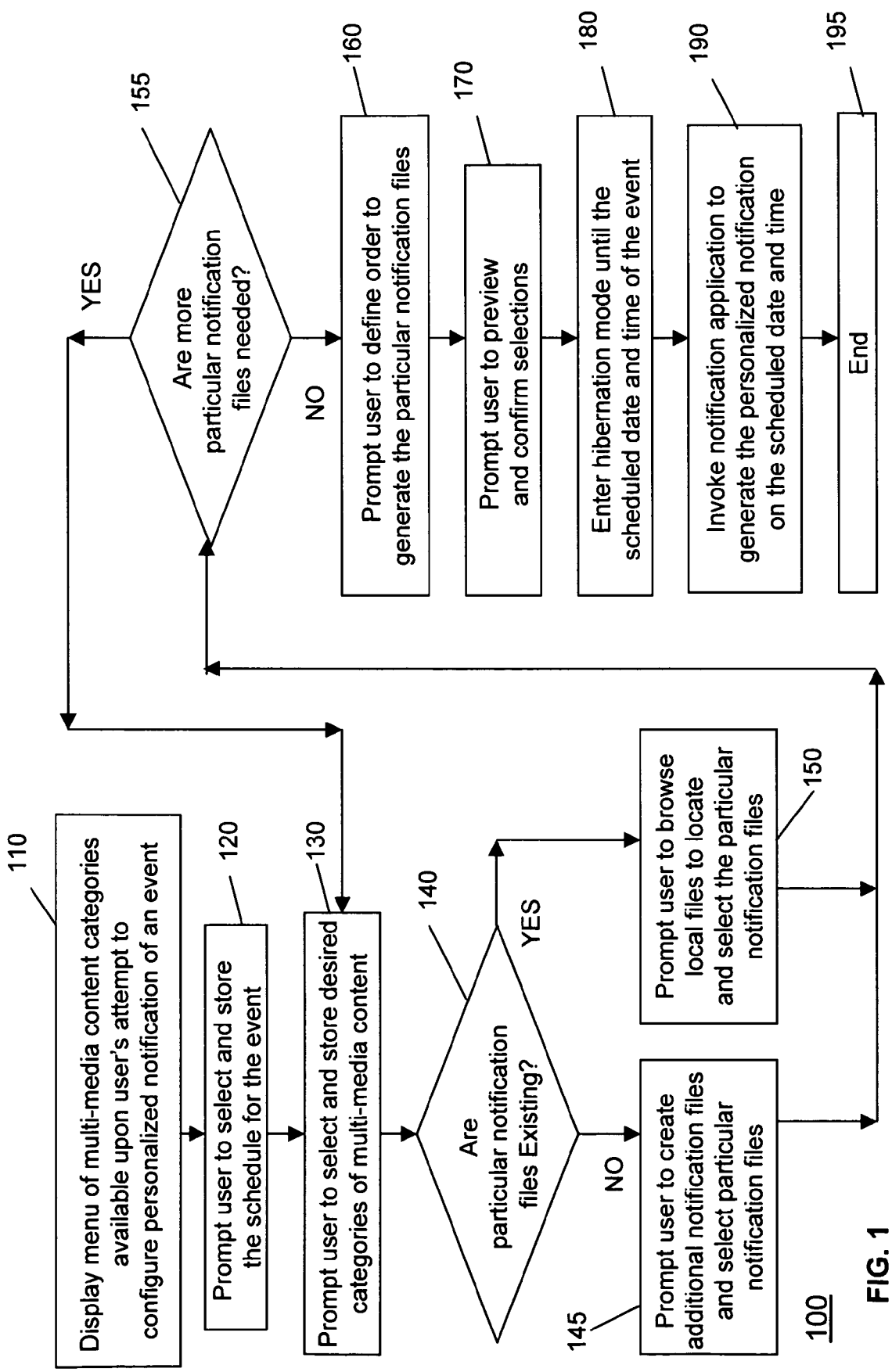
FIG. 1 shows an illustrative flow chart for a method of operating the end-user device personalized application notification feature.

FIG. 1 shows a flow chart of the operation of the end-user device personalized application notification feature 100 in accordance with the principles of the present invention. The process is entered in step 110 when a main menu, not shown, on the mobile telephone is displayed upon a user's attempt to configure a personalized notification of a specific event. Illustratively, the user may access the present invention by navigating the main menu through the following menu screens, not shown: Main Menu→Applications→Personalized Notification Service→Define new schedule.

In step 120, the user may be prompted to select a schedule, e.g., date, time, frequency of occurrence, for the specific event. In this context, "select" means choosing an item from a menu or inputting information on a screen such that a processor, not shown, running the present invention, i.e., the personalized application notification feature, in the mobile telephone may react to the instruction. The frequency may be one-time or recurring, e.g., every day, every week, every month, etc. The user may enter information by pressing keys on a handset of the mobile telephone or, if the mobile telephone has speech recognition capabilities, then the user may enter the information via a voice response. Afterwards, the user may store the defined schedule.

In step 130, the user may be prompted to enter a Notification mode of the present invention to select the multi-media content desired for the specific event. Upon entering the Notification mode, the present invention searches for and displays a menu of all multi-media content categories available on the mobile telephone. The user may be prompted to select one or more of the following multi-media content categories found during the search: a) chimes, b) text messages, c) images, d) audio, e) video clips and f) ring tones. Illustratively, in FIG. 2, Select Multi-media Content Categories 210 is a menu screen for selecting the desired multi-media content categories. After selecting the desired multi-media content category, the user may store the selected multi-media content categories.

Figure 2:
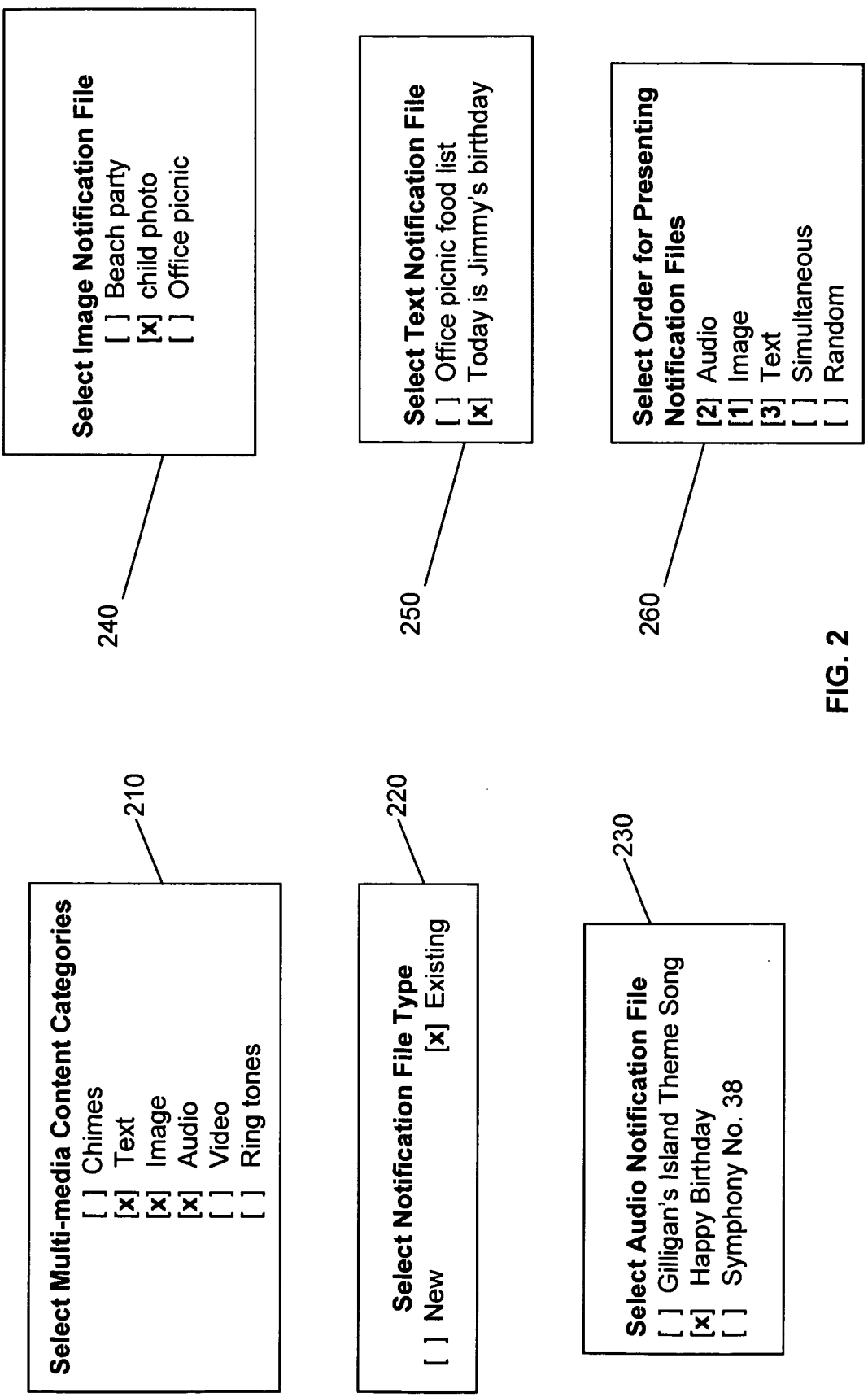
FIG. 2 shows an illustrative view of menu screens for the present invention of the end-user device personalized application notification feature.

Upon selecting each multi-media content category, a list of multi-media content files, i.e., existing notification files, available on the mobile telephone and associated with the selected multi-media content category may be displayed (FIG. 2). Alternatively, upon selecting each multi-media content category the number of multi-media content files available on the mobile telephone and associated with the selected multi-media content category may be displayed, e.g., 3 audio files, 3 image files, 2 text message files.

In step 140 (FIG. 1), it is necessary to prompt the user to indicate whether a desired notification file is "Existing" or "New" by selecting the appropriate file type (FIG. 2, Select Notification File Type 220). Indicating that the notification file is "Existing" means that one or more particular notification files are already resident on the mobile telephone and available for use. Particular notification files are used to notify and remind the user of the specific event. Indicating that the notification file is "New" means that the user must create one or more additional notification files. Illustratively, the user may desire to use a photo of a child as a reminder of the child's birthday. Thus, the photo of the child currently on the mobile telephone would be indicated as "Existing" and associated with the image multi-media category. Alternatively, if the photo of the child must be added onto the mobile telephone, then the newly created image file is "New".

If the test result in conditional branch point 140 (FIG. 1) is NO, indicating that the user of mobile telephone must create one or more additional notification files, then control is passed to step 145. In step 145, the user may be prompted to create one or more additional notification files by a) downloading new notification files, e.g., images, video, ring tones, etc., to the mobile telephone, b) recording new notification files, e.g., video, audio, etc., onto the mobile telephone, c) using a built-in camera of the mobile telephone to capture a still image or a small video clip as new notification files, or d) composing new notification files, e.g., text messages, onto the mobile telephone. The present invention associates each of the newly created one or more additional notification files with the appropriate multi-media content category, e.g., downloaded songs are associated with the audio multi-media content category.

When downloading files, the user may provide a Uniform Resource Locator (URL) or a Uniform Resource Identifier (URI) so that the mobile telephone may access a web site for the user to select the one or more additional notification files. Optionally, the user may delay providing the URL or URI until a time of notification, i.e., the scheduled date and time. This option assumes that the one or more additional notification files on the web site do not change and that the mobile telephone is connected to the Internet at the time of notification. If the user delays providing the URL or URI until the time of notification and the mobile telephone is not connected to the Internet, then a default notification file, predetermined by the user, may be provided.

Upon creating the one or more additional notification files, the user may a) store the newly created one or more notification files for future re-use and b) select one or more of the newly created notification files as particular notification files for the specific event. Then control is passed to step 155.

If the test result in step 140 is YES, indicating that all of the notification files are already resident on the mobile telephone, then control is passed to step 150.

In step 150 (FIG. 1), the user may be prompted to browse a local file system on the mobile telephone to locate and select one or more particular notification files, e.g., a favorite song such as "Happy Birthday", within each selected multi-media content category, e.g., audio clip (FIG. 2, Select Audio Notification File 230). If the mobile telephone supports a JAVA™ Platform, Micro Edition (J2ME™) application execution environment and the optional package—FileConnection, as defined in JAVA Specification Request 75 (JSR-75), then the user may browse the mobile telephone's local file system using the FileConnection package.

In step 155 (FIG. 1), after creating new notification files or selecting existing notification files on the mobile telephone, it is necessary to prompt the user to indicate whether additional notification files are needed. Illustratively, after creating the one or more additional notification files in step 145, the user may desire notification files that are existing on the mobile telephone. Also illustratively, a user who originally selected "Existing" notification files in step 140 may desire to create new notification files. If the test result in conditional branch point 155 is YES, indicating that the user of mobile telephone desires one or more additional notification files, then control is passed to step 130. If the test result in conditional branch point 155 is NO, indicating that the user of mobile telephone does not require additional notification files, then control is passed to step 160.

In step 160 (FIG. 1), the user may be prompted to select the order in which the one or more particular notification files should be generated and presented to the user at the time of notification (FIG. 2, Select Order for Presenting Notification Files 260). The one or more particular notification files may be generated simultaneously, randomly or in a defined sequence, e.g., $1^{st}, 2^{nd}, 3^{rd}, \ldots, n^{th}$.

In step 170 (FIG. 1), the user may be prompted to a) preview the selections, i.e., the scheduled date and time, frequency and the particular notification files, and b) confirm that the selections are correct. Alternatively, the user may cancel the selections and start over if the user is dissatisfied with the preview.

In step 180, after the user confirms that the selections are correct, the selections are saved in the mobile telephone's memory, not shown, and the present invention enters into a hibernation mode until the scheduled date and time of the specific event.

In step 190, a notification application on the mobile telephone is invoked along with pointers to the particular notification files selected by the user. The notification application generates the particular notification files as a personalized notification to remind the user of the specific event. Illustratively, the user may $1^{st}$ see a favorite picture, e.g., "child photo", $2^{nd}$ hear the favorite song, e.g., "Happy Birthday", and $3^{rd}$ read a text message, e.g., "Today is Jimmy's birthday" (FIG. 2, Select Order for Presenting Notification Files 280, Select Audio Notification File 230, Select Image Notification File 240, and Select Text Notification File 250), when the alarm clock application program is activated. If the mobile telephone has text-to-speech capabilities, then the user may be able to listen to a human sounding voice speak the text message. The notification application may be written in BINARY RUNTIME ENVIRONMENT FOR WIRELESS™ (BREW™), J2ME or similar application development platforms. Also, the notification application may replace other notification functions on existing alarm clock or calendar applications residing on the mobile telephone.

The process is exited in step 195.

The foregoing merely illustrates the embodiments of the invention. It will thus be appreciated that those skilled in the art will be able to devise various arrangements, which, although not explicitly described or shown herein, embody the principles of the invention, and are included within its spirit and scope.

What is claimed:

1. A method, comprising the steps of:
   displaying, upon an attempt by a user of a communications device to configure a personalized notification of a specific event, a menu of categories of multi-media content available on the communications device and a number of multi-media content files available on the communications device and associated with each category of multi-media content, wherein one type of the communications device comprises a portable media player that allows an addition of executable programs;
   storing, upon selection by the user, the categories of multi-media content desired by the user and a scheduled date and time for the specific event on the communications device; and
   generating, upon an occurrence of the scheduled date and time, the personalized notification on the communications device, wherein the personalized notification contains particular notification files in a specific order selected by the user and associated with the categories of multi-media content, and wherein the communications device is configured to notify the user via a text-to-speech conversion when the personalized notification has multi-media content with a text component.

2. The method of claim 1 wherein the categories of multi-media content available on the communications device are selected from the group consisting of chimes, text messages, images, audio, video clips, and ring tones.

3. The method of claim 1 wherein the displaying step further comprises the step of prompting the user to indicate whether the particular notification files are resident on the communications device.

4. The method of claim 3 further comprising the steps of:
   prompting the user to browse a local file system on the communications device to locate and select the particular notification files if the user indicates that the particular notification files are resident on the communications device; and
   prompting the user to create additional notification files if the user indicates that the particular notification files are not resident on the communications device.

5. The method of claim 4 wherein the prompting the user to browse step further comprises the step of browsing the local file system.

6. The method of claim 4 wherein the prompting the user to browse step further comprises the step of browsing the local file system via a FileConnection package.

7. The method of claim 4 wherein the prompting the user to create additional notification files step further comprises the steps of:
   prompting the user to download one or more new notification files to the communications device;
   storing the one or more new notification files on the communications device for future re-use; and
   selecting at least one of the new notification files as at least one of the particular notification files for the specific event.

8. The method of claim 4 wherein the prompting the user to create additional notification files step further comprises the steps of:
   prompting the user to record one or more new notification files onto the communications device;
   storing the one or more new notification files on the communications device for future re-use; and
   selecting at least one of the new notification files as at least one of the particular notification files for the specific event.

9. The method of claim 4 wherein the prompting the user to create additional notification files step further comprises the steps of:
   prompting the user to use a built-in camera of the communications device to capture still images as one or more new notification files;
   storing the one or more new notification files on the communications device for future re-use; and
   selecting at least one of the new notification files as at least one of the particular notification files for the specific event.

10. The method of claim 4 wherein the prompting the user to create additional notification files step further comprises the steps of:
    prompting the user to compose one or more new notification files onto the communications device;
    storing the one or more new notification files on the communications device for future re-use; and
    selecting at least one of the new notification files as at least one of the particular notification files for the specific event.

11. The method of claim 7 wherein the user provides a Uniform Resource Identifier (URI) when prompted to download the one or more new notification files to the communications device.

12. The method of claim 7 wherein the user provides a Uniform Resource Locator (URL) when prompted to download the one or more new notification files to the communications device.

13. The method of claim 4 further comprising the steps of:
    prompting the user to select more particular notification files if needed; and prompting the user to select the specific order to generate the particular notification files.

14. The method of claim 13 further comprising the step of:
entering into a hibernation mode after the user previews the selections and confirms the scheduled date and time for the specific event and the particular notification files selected by the user;
wherein the hibernation mode terminates upon the scheduled date and time for the specific event.

15. The method of claim 1 wherein the communications device comprises mean to enable the user to select desired categories of multi-media content via a voice response or by pressing keys on a handset of the communications device.

16. The method of claim 1 wherein the communications device is selected from the group consisting of a mobile telephone, a personal digital assistance (PDA) device, a two-way pager, the portable media player that allows the addition of the executable programs, a notebook computer, and a desk top computer.

17. The method of claim 1 further comprising the step of storing, upon selection by the user, a frequency of the specific event, wherein the frequency of the specific event is a one-time event.

18. The method of claim 1 wherein the generating step is invoked by a notification application based on an application development platform.

19. The method of claim 1 further comprising the step of storing, upon selection by the user, a frequency of the specific event on the communications device, wherein the frequency of the specific event is a recurring event.

20. The method of claim 1 wherein one specific order is a random order and another specific order is a defined sequence.

21. The method of claim 1 further comprising the step of canceling the selections when indicated by the user to re-start the configuration.

22. The method of claim 1 further comprising the step of generating a default file when the selected categories of multi-media content are unavailable.

23. The method of claim 1 wherein at least one of the categories comprises text messages.

24. A non-transitory computer-readable medium having computer executable instructions for performing steps, comprising:
displaying on a communications device one or more categories of multi-media content and a number of multi-media content files available on the communications device and associated with each category of multi-media content, wherein one type of the communications device comprises a portable media player that allows an addition of executable programs; and
wherein the displaying enables a user of the communications device to select a) multi-media content files and b) an order to provide the selected multi-media content files in a personalized notification on the communications device, and
wherein the communications device is configured to notify the user via a text-to-speech conversion when the personalized notification has multi-media content with a text component.

25. A communications device, comprising:
one or more menu screens configured to enable a user of the communications device to select
multi-media content files from one or more categories of multi-media content available on the communications device or external to the communications device, wherein one type of the communications device comprises a portable media player that allows an addition of executable programs; and
an order to provide the selected multi-media content files in a personalized notification on the communications device, wherein the communications device is configured to notify the user via a text-to-speech conversion when the personalized notification has multi-media content with a text component.

26. A method for operating a communications device to notify a user of the communications device of a specific event, the method comprising the step of:
generating, via a notification application, a personalized notification on the communications device upon an occurrence of a scheduled date and time selected by the user, wherein one type of the communications device comprises a portable media player that allows an addition of executable programs; and
wherein the personalized notification contains one or more multi-media content files selected by the user via one or more menus that show categories of multi-media content available on the communications device and a number of multi-media content files available on the communications device and associated with each category of multi-media content, and
wherein the communications device is configured to notify the user via a text-to-speech conversion when the personalized notification has multi-media content with a text component.

27. The method of claim 26 wherein the one or more multi-media content files are selected from the group consisting of chimes, text messages, images, audio, video clips, and ring tones.

28. The method of claim 26 wherein the communications device is selected from the group consisting of a mobile telephone, a personal digital assistance (PDA) device, a two-way pager, the portable media player that allows the addition of the executable programs, a notebook computer, and a desk top computer.

* * * * *